United States Patent [19]

Machida

[11] Patent Number: 4,500,909
[45] Date of Patent: Feb. 19, 1985

[54] SYNCHRONIZING SIGNAL GENERATING APPARATUS

[75] Inventor: Toyotaka Machida, Kashiwa, Japan

[73] Assignee: Victor Company of Japan, Ltd., Kanagawa, Japan

[21] Appl. No.: 457,949

[22] Filed: Jan. 14, 1983

[30] Foreign Application Priority Data

Jan. 21, 1982 [JP] Japan ................................. 57-7974
Feb. 10, 1982 [JP] Japan ............................... 57-19971

[51] Int. Cl.³ .............................................. H04N 5/06
[52] U.S. Cl. .................................... 358/17; 358/150
[58] Field of Search ................. 358/17, 18, 19, 150

[56] References Cited

U.S. PATENT DOCUMENTS

4,295,157 10/1981 Machida ................................. 358/17
4,295,158 10/1981 Nissen .................................... 358/17
4,390,892 6/1983 Banks .................................... 358/150

*Primary Examiner*—Michael A. Masinick
*Attorney, Agent, or Firm*—Ladas & Parry

[57] ABSTRACT

A synchronizing signal generating apparatus comprises a first frequency generator for at least generating a frequency which is 4c times a chrominance subcarrier frequency of B, G, H, and I/PAL systems, where c is a factor of (625×n) and n is an arbitrary positive integer, a second frequency generator for generating a frequency which is (11×n) times a horizontal scanning frequency, a phase control circuit for comparing phases of an output of a first frequency divider which frequency-divides an output signal frequency of the first frequency generator by 1/64489 and an output of a second frequency divider which frequency-divides an output signal frequency of the second frequency generator by 1/(625×n) to supply a phase error signal in accordance with the compared result to the first frequency generator or the second frequency generator to variably control the output signal frequency of the first frequency generator or the second frequency generator, a third frequency divider for frequency-dividing the output signal frequency of the first frequency generator to produce a frequency equal to the chrominance subcarrier frequency, and a fourth frequency divider for frequency-dividing the output signal frequency of the second frequency generator by 1/(11×n).

6 Claims, 11 Drawing Figures

SYNCHRONIZING SIGNAL GENERATING APPARATUS

BACKGROUND OF THE INVENTION

The present invention generally relates to synchronizing signal generating apparatuses, and more particularly to a synchronizing signal generating apparatus capable of generating synchronizing signals having different frequencies which are used in different television systems, by use of the same circuit construction.

Presently, television systems employed throughout the world are not the same, and numerous different television systems exist each each part of the world. For example, in black-and-white television systems, there are television systems designated by characters such as "A", "B", "C", "D", "E", "G", "H", "I", "K", "K1", "L", "M", "N", and the like before the same of the system. The number of scanning lines is 2405 in the system A, while the number of scanning lines is 819 in the system E, but these systems are used less frequently these days. Among the above systems excluding the systems A and E, only the system M employs 525 scanning lines, and the horizontal scanning frequency is 15.75 kHz (in the case of a color television system which will be described hereinafter, the horizontal scanning frequency is 15.734 . . . kHz). All the other systems employ 625 scanning lines, and the horizontal scanning frequency is 15.625 kHz.

On the other hand, among color television signals, there are three types, that is, the "NTSC", "PAL", and "SECAM" system color television signals according to the transmission format of the chrominance signal. There are several color television systems which combine one of these three types of color television signals with one of the above described television systems. In terms of the relation between the chrominance subcarrier frequency $f_{SC}$ and the horizontal scanning frequency $f_H$, the color television systems may be generally classified into five systems, that is, M/NTSC system, M/PAL system, B, G, H, or I/PAL system (hereinafter simply referred to as a B/PAL system), N/PAL system, and B, D, G, H, K1, or L/SECAM system (hereinafter simply referred to as a SECAM system).

For example, because the chrominance subcarrier frequency $f_{SC}$ of the PAL system color television system comprises offsets of $f_H/4$ and $f_V/2$, where $f_H$ is the horizontal scanning frequency of the PAL system and $f_V$ is the vertical scanning frequency of the PAL system, the following equation stands between the frequencies $f_{SC}$ and $f_H$.

$$f_{SC} = (284 - \tfrac{1}{4} + 1/625)f_H = 283.7516 f_H$$

Hence, the frequencies $f_{SC}$ and $f_H$ cannot be described by a simple ratio of integers.

The following relations are obtained between the chrominance subcarrier frequency $f_{SC}$ and the horizontal scanning frequency $f_H$ for the five color television systems.

M/NTSC system $f_{SC} = 455 f_H / 2$ (1)

M/PAL system $f_{SC} = 909 f_H / 4$ (2)

B/PAL system $f_{SC} = (1135/4 + 1/625) f_H$ (3)

N/PAL system $f_{SC} = (917/4 + 1/625) f_H$ (4)

-continued

SECAM system $f_{OB} = 272 f_H$ (5)

$f_{OR} = 282 f_H$

As clearly seen from the above equations (1) through (4), the relation between the chrominance subcarrier frequency $f_{SC}$ and the horizontal scanning frequency $f_H$ cannot be described by a simple ratio of integers for the four color television systems excluding the SECAM system, and in these four color television systems, it was difficult to obtain the horizontal scanning frequency $f_H$ by frequency-dividing the chrominance subcarrier frequency $f_{SC}$. Accordingly, the conventional synchronizing signal generating apparatus was designed to obtain sums and differences of frequencies by use of a balanced oscillator and the like. As a result, the circuit construction of the conventional synchronizing signal generating apparatus become complex, and analog circuits coexisted with digital circuits. Further, due to reasons such as the need for precise adjustment of the analog circuits and the like, it was difficult to design the circuit as a single integrated circuit (IC). In addition, the conventional synchronizing signal generating circuit merely generated a synchronizing signal of one of the above five color television systems.

SUMMARY OF THE INVENTION

Accordingly, it is a general object of the present invention to provide a novel and useful synchronizing signal generating apparatus in which the above described problems have been overcome.

Another and more specific object of the present invention is to provide a synchronizing signal generating apparatus in which frequency dividing ratios of each of frequency dividers and frequency dividing circuit means is an integral reciprocal enabling design by digital circuits, so that the entire circuit can be designed as a single integrated circuit except for time constant circuits of a first frequency generator or a second frequency generator which is controlled of its frequency by an output phase error signal of a phase comparator and a crystal oscillator of the first or the second frequency generator. According to the apparatus of the present invention, the apparatus can be downsized compared to conventional synchronizing signal generating apparatuses, and the reliability of the apparatus can be improved.

Still another object of the present invention is to provide a synchronizing signal generating apparatus capable of generating a chrominance subcarrier frequency of an arbitrary color television system among a plurality of kinds of color television systems, and a synchronizing signal in accurate predetermined frequency relation with that chrominance subcarrier frequency, by only requiring a simple switching of circuits in a circuit part having a large portion thereof used in common for obtaining each of the chrominance subcarrier frequencies and the synchronizing signals of each of the color television systems.

Another object of the present invention is to provide a synchronizing signal generating apparatus capable of generating various pulse series related to the horizontal scanning frequency, in terms of minute time intervals obtained by dividing one horizontal scanning period into a plurality of intervals. The number of the divided intervals is set to a number sufficiently satisfying standards of all synchronizing signals of each of the color television systems, and the apparatus according to the present invention may be used to sufficiently satisfy the needs of a high-quality television cameras and the like.

Other objects and further features of the present invention will be apparent from the following detailed description when read in conjunction with the accompanying drawings.

DETAILED DESCRIPTION

Figure 1:
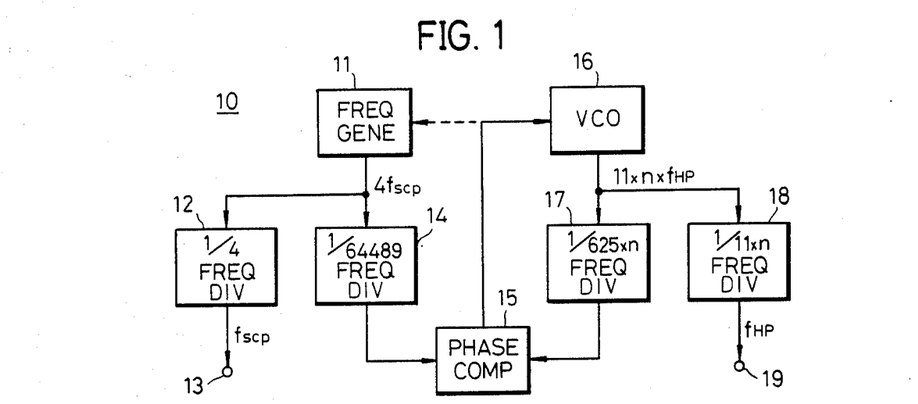
FIG. 1 is a systematic block diagram showing a first embodiment of a synchronizing signal generating apparatus according to the present invention.

A first embodiment of a synchronizing signal generating apparatus according to the present invention shown in FIG. 1 is designed to selectively generate synchronizing signals of the PAL system and the SECAM system. A synchronizing signal generating apparatus 10 according to the present embodiment, has a circuit construction satisfying the following basic equation, where $f_{SCP}$ represents the chrominance subcarrier frequency of the PAL system, $f_{HP}$ represents the horizontal scanning frequency of the PAL system, and n is a positive integer.

$$4f_{scp} \times 1/64489 = (11 \times n)/(625 \times n) \times f_{HP} \qquad (6)$$

In equation (6), $4f_{scp}$ becomes equal to $1135.0064f_{Hp}$ because the chrominance subcarrier frequency $f_{SCP}$ of the B/PAL system is equal to $283.7516f_{Hp}$ as indicated in equation (3) described previously. If this value for $4f_{scp}$ is substituted into equation (6), the following result which satisfies the relation between the chrominance subcarrier frequency $f_{SCP}$ and the horizontal scanning frequency $f_{HP}$ can be obtained.

$$1135.0064 \times 625/64489 = 11$$

The apparatus 10 according to the present embodiment is designed to realize the above basic equation.

A frequency generator 11 is a circuit for generating a frequency $4f_{scp}$ which is four times the chrominance subcarrier frequency $f_{SCP}$ (=4.43361875 MHz), and comprises oscillating circuits oscillating at this frequency $4f_{scp}$ or circuits which generate the frequency $4f_{scp}$ from another frequency through frequency division and the like. The output signal of the frequency generator 11 having the frequency $4f_{scp}$, is frequency-divided at a ¼-frequency divider 12 and produced through an output terminal 13. On the other hand, the output signal of the frequency generator 11 is formed into a signal having a frequency $4f_{scp}/64489$ (=$2.75 \times 10^{-4}$ MHz) by a frequency divider 14 having a frequency dividing ratio 1/64489, and then supplied to a phase comparator 15.

An output phase error voltage of the phase comparator 15 is applied to a voltage controlled oscillator (VCO) as a control voltage, to variably control an output oscillation frequency of the VCO 16. The VCO 16 oscillates at a frequency in a range of $(11 \times n)$ times the horizontal scanning frequency $f_{HP}$ of the B/PAL system. The output oscillation frequency of the VCO 16 is frequency-divided by $1/(625 \times n)$ into a frequency in a range of $(11 \times n \times f_{Hp})/(625 \times n)$ (=$2.75 \times 10^{-4}$ MHz) at a frequency divider 17 which has a frequency dividing ratio $1/(625 \times n)$. An output signal of the frequency divider 17 is supplied to the phase comparator 15 wherein the output signal of the frequency divider 17 is subjected to phase comparison with the signal from the frequency divider 14. The oscillation frequency of the VCO 16 is controlled so that the phase error at the phase comparator 15 becomes zero, according to a loop constituted by the phase comparator 15, VCO 16, and frequency divider 17. As a result, the oscillation frequency of the VCO 16 is in phase synchronism with the output signal of the frequency divider 14 and with the output signal of the frequency generator 11. In addition, the following equation stands.

$$4f_{scp}/64489 = (11 \times n \times f_{Hp})/(625 \times n)$$

Therefore, the frequency $f_{SCP}$ can be described by the following equation.

$$f_{SCP} = (64489/4) \times (11/625) \times f_{HP} = 283.7516 f_{Hp}$$

Accordingly, the relation between the chrominance subcarrier frequency $f_{SCP}$ and the horizontal scanning frequency $f_{HP}$ of the B/PAL system shown in equation (3) is satisfied.

The output signal of the VCO 16 is passed through a frequency divider 18 having a frequency dividing ratio $1/(11 \times n)$, and produced as a signal having a frequency $f_{HP}$ through an output terminal 19. The frequency $f_{HP}$ of the signal produced through the output terminal 19 satisfies the relation defined in equation (3) with respect to the frequency $f_{SCP}$ of the signal obtained through the output terminal 13.

Thus, according to the present embodiment, there is no need to use analog circuits for obtaining sums or differences of frequencies, and the circuit may be designed solely from digital circuits. The circuit accordingly designed from the digital circuits is capable of obtaining the chrominance subcarrier frequency $f_{SCP}$ and the horizontal scanning frequency $f_{HP}$ of the B/PAL system which satisfy the relation defined in equation (3).

In the above embodiment, the output oscillation frequency of the VCO 16 is variably controlled by the output phase error voltage of the phase comparator 15. However, the frequency generator 11 may be designed as a variable frequency oscillator such as the VCO, and an oscillator (a crystal oscillator, for example) having a high frequency stability which produces an oscillation output frequency ($11 \times n \times f_{HP}$) may be used instead of the VCO 16. In this case, the output frequency of the frequency generator 11 which generates the frequency $4f_{scp}$ may be controlled as indicated by a dotted line in FIG. 1, so that the output frequency becomes in phase synchronism with the frequency ($11 \times n \times f_{HP}$). The chrominance subcarrier frequency $f_{SCP}$ and the horizontal scanning frequency $f_{HP}$ satisfying the relation defined in equation (3) may also be obtained in this case.

The value of the integer n can be selected to an arbitrary value, however, the output signal of the VCO 16 is distorted in most cases. Hence, although an output signal of a constant period may be obtained, it is difficult in most cases to obtain a symmetrical square wave having a 50% duty cycle. In such a case, it is desirable for the integer n to be an even number, because a symmetrical square wave can be obtained by frequency-dividing the frequency into $\frac{1}{2}$ the original frequency at one stage of flip-flop. It is not essential to select the value of n in this manner if only the horizontal scanning frequency $f_{HP}$ is to be obtained, however, it is desirable to select value of n in this manner because there is a need to produce a burst flag pulse, a blanking pulse, and the like as a synchronizing signal, in terms of minute time intervals as will be described hereinafter.

Furthermore, a frequency $f_{Vp}$ of the vertical synchronizing signal is 2/625 times the horizontal scanning frequency $f_{HP}$, and it becomes necessary to obtain a frequency $f_{HP}$ in order to form the vertical synchronizing signal. Therefore, it is desirable for the integer n to be a multiple of ($2 \times 2$), that is, $n = 4m$, where m is an arbitrary positive integer. The following equation (7) is obtained if $n = 4m$ is substituted into equation (6).

$$4f_{scp} \times 1/64489 = (11 \times 4 \times m)/625 \times 4 \times m) \times f_{HP} \quad (7)$$

Figure 2:
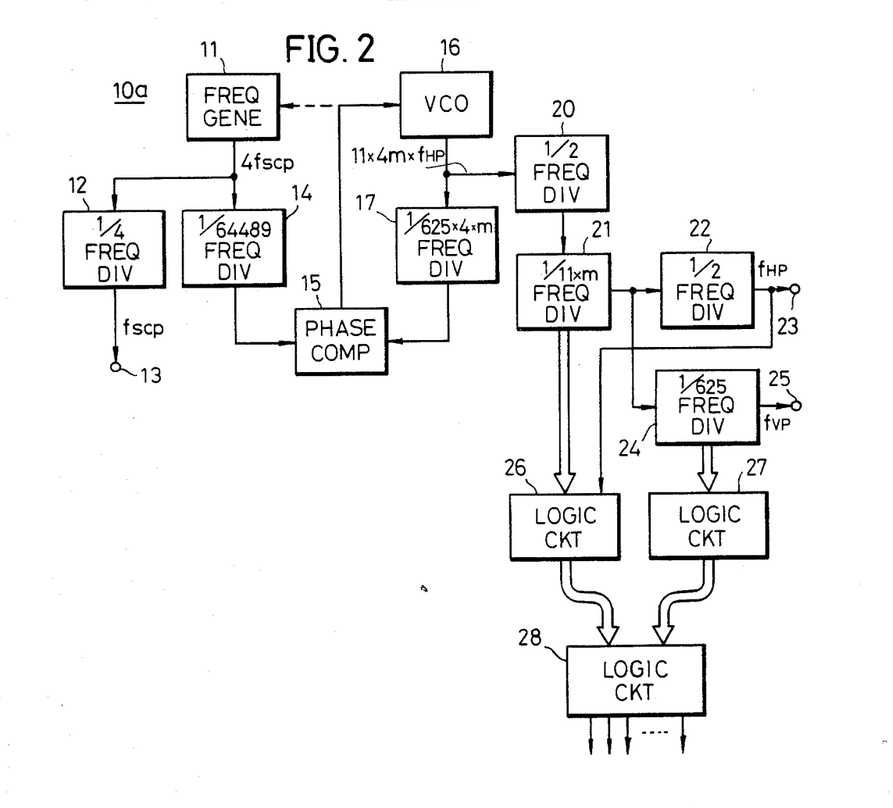
FIG. 2 is a systematic block diagram showing a second embodiment of a synchronizing signal generating apparatus according to the present invention.

FIG. 2 shows a systematic block diagram of a synchronizing signal generating apparatus 10a which is a second embodiment of an apparatus according to the present invention for realizing equation (7). In FIG. 2, those parts which are the same as those corresponding parts in FIG. 1 are designated by the same reference numerals, and their description will be omitted. In the block system shown in FIG. 2, $n = 4m$. In FIG. 2, the signal having the frequency ($11 \times 4 \times m \times f_{HP}$) which is obtained from the VCO 16, is supplied to a $\frac{1}{2}$-frequency divider 20 wherein the signal is accurately formed into a symmetrical square wave having a frequency $22mf_{Hp}$. The output of the frequency divider 20 is supplied to a frequency divider 21 having a frequency dividing ratio $1/(11 \times m)$, and the frequency of the output of the frequency divider 20 is frequency divided into a frequency $2f_{Hp}$. The signal having the frequency $2f_{Hp}$ is further formed into a signal having the horizontal scanning frequency $f_{HP}$ at a frequency divider 22 and produced through an output terminal 23. At the same time, the output of the frequency divider 22 is also supplied to a 1/625-frequency divider 24 wherein the output frequency of the frequency divider 22 is frequency-divided by 1/625 into the vertical scanning frequency $f_{Vp}$. This output signal of the frequency divider 24 having the vertical scanning frequency $f_{Vp}$ is produced through an output terminal 25.

On the other hand, although there is no direct relation with the present invention, each of outputs of flip-flops constituting the frequency dividers 21, 22, and 24 are supplied to logic circuits 26 and 27 in order to form various pulse waveforms. The logic circuit 26 produces various pulse series related to the horizontal synchronism, and the logic circuit 27 produces various pulse series related to the vertical synchronism. Each of the pulse series from the logic circuits 26 and 27 are respectively supplied to a logic circuit 28 according to the needs, to produce various pulse series such as a composite synchronizing signal, composite blanking signal, and burst flag signal. Read only memories (ROMs) may be used for the above logic circuits 26, 27, and 28.

Figure 3:
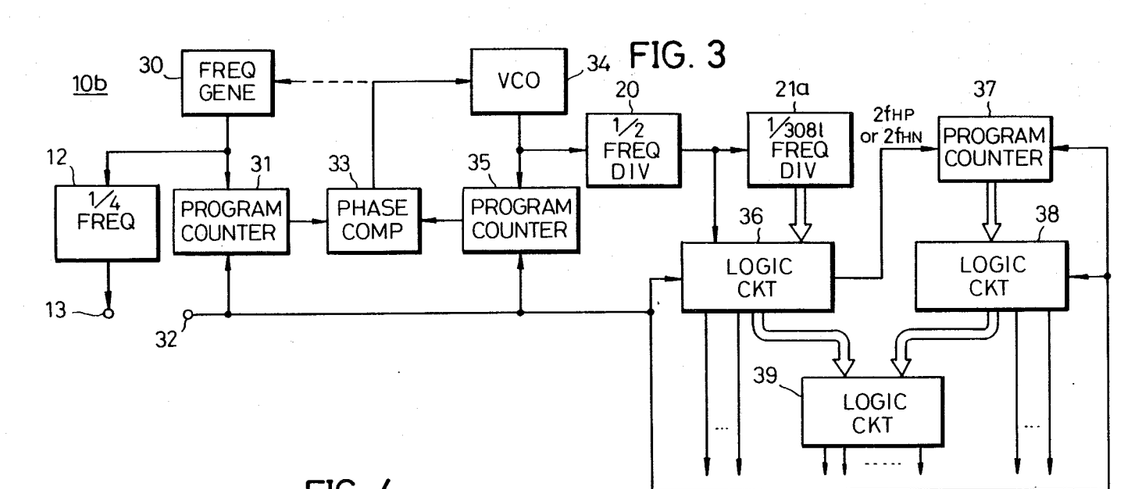
FIG. 3 is a systematic block diagram showing a third embodiment of a synchronizing signal generating apparatus according to the present invention.

Next, description will be given with respect to a synchronizing signal generating apparatus 10b which is a third embodiment of an apparatus according to the present invention. In FIG. 3, those parts which are the same as those corresponding parts in FIG. 1 are designated by the same reference numerals, and their description will be omitted. Only the synchronizing signal and the chrominance subcarrier frequency $f_{SCP}$ of the B/PAL system are generated by use of digital circuits according to the first and second embodiments described heretofore. However, it is more desirable to design a circuit which can generate a synchronizing signal and a chrominance subcarrier frequency $f_{SCN}$ of the M/NTSC system, requiring only a simple switching of circuits and using a large portion of the circuit in common for obtaining synchronizing signals and chrominance subcarrier frequencies of other color television systems. In addition, as is well known, the carrier chrominance signal of the SECAM system is a line sequential signal in which an FM signal obtained by frequency-modulating a first chrominance subcarrier frequency $282f_{HS}$ (where $f_{HS}$ is the horizontal scanning frequency of the SECAM system) by a color difference signal $(R-Y)$ and an FM signal obtained by frequency-modulating a second chrominance subcarrier frequency $272f_{HS}$ by a color difference signal $(B-Y)$ are alternately composed time-sequentially for every horizontal scanning period. Accordingly, it is also desirable for the circuit to generate at least one of these two chrominance subcarrier frequencies $282f_{HS}$ and $272f_{HS}$.

With respect to the horizontal scanning frequency, the system M uses a horizontal scanning frequency 15.734264 kHz and the other systems use a horizontal scanning frequency 15.625 kHz. Thus, there is little difference between the two horizontal scanning frequencies. Moreover, the waveforms (interval of the front porch, interval of the back porch, and the like) of each of the horizontal synchronizing signals of the M/NTSC system, B/PAL system, and the M/PAL system, N/PAL system, and SECAM system which will be described hereinafter, closely resemble each other.

Hence, one horizontal scanning period can be divided by the same number in each of the color television systems, and in this case, the frequency divider 21 can be used in common for each of the color television systems. Further, the circuit construction can be simplified because a large portion of the logic circuit 26 can also be used in common for each of the color television systems. Accordingly, it becomes desirable to set the above division number in common for each of the color television systems, and frequency dividing ratios of programmable counters 31 and 35 shown in FIG. 3 are desirably set to integral reciprocals even upon switching in accordance with each of the color television systems. Moreover, it is desirable to set a frequency dividing ratio of a frequency divider which frequency-divides an integral multiple frequency of the frequency $f_{HP}$ to obtain the frequency $272f_{HS}(=272f_{HP})$, for example, of the two chrominance subcarrier frequencies of the SECAM system, to an integral reciprocal. In order to achieve the above desirable conditions, the integer m is preferably set equal to "14" or a multiple of "14".

If the integer m is set to $(14 \times l)$ which is a multiple of "14", where l is an arbitrary positive integer, the following equation is obtained by substituting this value for m.

$$4f_{SCP} \times 1/64489 = (11 \times 4 \times 14 \times l)/(625 \times 4 \times 14 \times l) \times f_{HP} \quad (8)$$

That is, an output oscillation frequency of a VCO 34 shown in FIG. 3 which is a second frequency generator and corresponds to the VCO 16 shown in FIG. 2, is equal to $(616 \times 1 \times f_{HP})$ $(=11 \times 4 \times 14 \times 1 \times f_{HP})$ upon generation of the synchronizing signal of the PAL system. Similarly, upon generation of the synchronizing signal of the M/NTSC system, the output oscillation frequency of the VCO 34 becomes equal to $(616 \times 1 \times f_{HN})$ as will be described hereinafter. Although l is an arbitrary positive integer, it is actually sufficient to set l equal to "1". This is because the oscillation frequency of the VCO 34 becomes too high for a VCO which is to be built-in within an integrated circuit, if l is greater than or equal to "2".

On the other hand, the chrominance subcarrier frequency $f_{SCN}$ of the M/NTSC system is related as follows with respect to the horizontal scanning frequency $f_{HN}$.

$$4f_{SCN} = 910f_{HN} \quad (9)$$

Accordingly, the following equation is formed if equation (9) is rewritten in a form similar to equation (6), where j is an arbitrary positive integer.

$$4f_{SCN} \times 1/(65 \times j) = (616 \times l)/(44 \times j \times l) \times f_{HN} \quad (10)$$

In addition, the frequency $272f_{HP}$ which is one of the two chrominance subcarrier frequencies of the SECAM system, can be obtained from the following equation, where r is a factor of $(77 \times l)$.

$$(r \times 616 \times l \times f_{HP})/(77 \times l) = (r \times 4 \times 272 \times f_{HP})/136 \quad (11)$$

The above described equations are satisfied in the third embodiment shown in FIG. 3. In FIG. 3, a frequency generator 30 generates a frequency which is four times the chrominance subcarrier frequency. If the synchronizing signal generating apparatus shown in FIG. 3 is to be used for the M/NTSC system, the frequency generator 30 generates the frequency $4f_{SCN}$, whereas the frequency generator 30 generates the frequency $f_{SCP}$ if the synchronizing signal generating apparatus is to be used for the B/PAL system. The frequency generator 30 generates the frequency $(4 \times 272f_{HP})$ if the synchronizing signal generating apparatus is to be used for the SECAM system. Whether the synchronizing signal generating apparatus is to be used for the M/NTSC system, B/PAL system, or SECAM system, is determined by the system of the apparatus such as a television camera into which the synchronizing signal generating apparatus is to be built-in. Hence, the output oscillation frequency of the frequency generator 30 is switched over to $4f_{SCN}$, $4f_{SCP}$, or $(4 \times 272f_{HP})$ according to the system of the apparatus such as the television camera. As a method of switching over the output oscillation frequency of the frequency generator 30, a first crystal oscillator having the frequency $f_{SCP}$, a second crystal oscillator having the frequency $f_{SCN}$, and a third crystal oscillator having the frequency $(4 \times 272f_{HP})$ may be switched over by switching connection of respective sockets. On the other hand, the first, second, and third crystal oscillators may be built-in, and the connection may be switched over by a switch.

Description will now be given with respect to the operation of the synchronizing signal generating apparatus when the apparatus is used for the B/PAL system. In this case, the signal having the frequency $4f_{SCP}$ which is obtained from the frequency generator 30 is supplied to the programmable counter 31. When the apparatus is used for the B/PAL system, the frequency dividing ratio of the programmable counter 31 is switched to 1/64489 which is equal to the frequency dividing ratio of the frequency divider 14 shown in FIG. 2, by a control signal supplied thereto through a terminal (or pin in the case of an IC) 32. Further, the control signal obtained through the terminal 32 is also supplied to programmable counters 35 and 37, and logic circuits 36 and 38. Frequency dividing ratios of the programmable counters 35 and 37 are accordingly controlled and switched to $1/(35000 \times 1)$ $(=1/(625 \times 4 \times 14 l))$ and 1/625, respectively. The logic circuits 36 and 38 are respectively switched so that various kinds of synchronizing signals of the B/PAL system can be obtained.

On the other hand, the VCO 34 oscillates at a frequency in a range of $(616 \times 1 \times f_{HP})$. This output oscillation frequency of the VCO 34 is frequency-divided by $1/(35000 \times 1)$ at the programmable counter 35, and then supplied to a phase comparator 33 wherein phases of the outputs of the programmable counters 31 and 35 are compared. An output phase error voltage of the phase comparator 33 is applied to the VCO 34, to variably control the output oscillation frequency of the VCO 34 so that the phase error at the phase comparator 33 becomes zero. Hence, the output oscillation frequency of the VCO 34 becomes equal to $(616 \times 1 \times f_{HP})$ which is in phase synchronism with the frequency $4f_{SCP}$, and the two input frequencies to the phase comparator 33 becomes equal as clearly understood from equation (8) described before. As in the apparatuses shown in FIGS. 1 and 2, the frequency generator 30 may be controlled by the output phase error voltage of the phase comparator 33 as indicated by a dotted line in FIG. 3.

The output signal of the VCO 34 is formed into a symmetrical square wave having a frequency $(308 \times 1 \times f_{HP})$ at the ½-frequency divider 20. The frequency of this symmetrical square wave obtained from the frequency divider 20 is further frequency-divided at a frequency divider 21a having a frequency dividing ratio $1/(308 \times 1)$. The output signal of the frequency divider 20 and each bit output of the frequency divider 21a are respectively supplied to the logic circuit 36. The frequency dividers 20 and 21a should have a circuit design such that a sequence is completed for every $1/(616 \times 1)$ by carrying out appropriate feedback to a series of binary frequency dividing circuits. In addition, the logic circuit 36 receives the outputs of the frequency dividers 20 and 21a, and produces various pulses by discriminating the value of a counter provided therein. Thus, the logic circuit 36 can produce various pulses in terms of intervals obtained by dividing the horizontal scanning frequency into (616×l) divisions. If the value of l is set equal to "1", the frequency 616f$_{HP}$ becomes equal to 9.625 MHz. Hence, an interval in which the frequency divider 21a (the frequency divider 21a is constituted from a counter) counts 308 output symmetrical square waves of the frequency divider 20 is equal to one horizontal scanning period when l is equal to "1". As a result, the signal having the frequency 2f$_{HP}$ which is supplied to the programmable counter 37 from the logic circuit 36, is a pulse series produced from the logic circuit 36 when the counted value at the frequency divider 21a is equal to "0" or "153".

The programmable counter 37 frequency-divides the frequency 2f$_{HP}$ of the signal obtained from the logic circuit 36 by 1/625, and supplies each bit output to the logic circuit 38. The logic circuit 38 produces various pulses such as a vertical driving signal having the vertical scanning period, according to the same principle used in the logic circuit 36. Each of the bit outputs of the logic circuits 36 and 38 are respectively supplied to a logic circuit 39 wherein a composite synchronizing signal, composite blanking signal, burst flag signal, and the like are produced as in the case of the logic circuit 28. ROMs may be used for the logic circuits 36, 38, and 39.

Next, description will be given with respect to the operation of the synchronizing signal generating apparatus when the apparatus is used for the M/NTSC system. In this case, the frequency generator 30 is switched over as described before so as to generate the frequency 4f$_{SCN}$. On the other hand, the frequency dividing ratios of the programmable counters 31, 35, and 37 are respectively switched to 1/(65×j), 1/(44×j×l), and 1/525, by the control signal obtained through the input terminal 32. Furthermore, circuit connections within the logic circuits 36 and 38 are switched over as will be described hereinafter, so that pulses having timings in accordance with the M/NTSC system can be obtained. As a result, the output signal frequency of the programmable counter 31 may be described by the first half of equation (10), and the output signal frequency of the programmable counter 35 may be described by the second half of equation (10). Thus, a signal having a frequency (616×l×f$_{HN}$) which is in phase synchronism with the frequency 4f$_{SCN}$, is obtained from the VCO 34. Therefore, the frequency dividers 20 and 21 can be used in common for the M/NTSC system as in the case of the B/PAL system, to generate various pulses from the logic circuit 36 in terms of intervals obtained by dividing the horizontal scanning period by (616×l). When l is set equal to "1", the frequency 616f$_{HN}$ becomes equal to 9.6923 MHz. Thereafter, various synchronizing signals and the chrominance subcarrier frequency f$_{SCN}$ of the M/NTSC system are respectively generated by operations similar to those carried out when the synchronizing signal generating apparatus is used for the B/PAL system.

Next, description will be given with respect to the operation of the synchronizing signal generating apparatus when one chrominance subcarrier frequency 272f$_{HP}$ of the two chrominance subcarrier frequencies of the SECAM system is to be obtained. In this case, the output signal frequency of the frequency generator 30 is switched over to the third frequency (r×4×272f$_{HP}$) as described previously. On the other hand, the frequency dividing ratios of the programmable counters 31, 35, and 37 are respectively switched to 1/136, r/(77×l), and 1/625, by the control signal obtained through the input terminal 32. Accordingly, the output signal frequency of the programmable counter 31 may be described by the second half of equation (11) which is (8×r×f$_{HP}$), and the output signal frequency of the programmable counter 35 may be described by the first half of equation (11) which is (8×r×f$_{HP}$). As a result, a signal having a frequency (616×l×f$_{HP}$) which is in phase synchronism with the frequency (r×4×272f$_{HP}$), is obtained from the VCO 34. Thus, in this case, a signal having the frequency 272f$_{HP}$ is obtained from the ¼-frequency divider 12 and produced through the output terminal 13 when r is equal to "1".

In the present embodiment, the synchronizing signal generating apparatus is constituted solely from digital circuits except for time constant circuits of VCOs, and may be easily designed as an integrated circuit as in the first and second embodiments described before. However, when designing the apparatus as an integrated circuit, crystal oscillators within the frequency generator 30 and the like are of course provided externally. The values of the frequencies are not limited to those in each of the embodiments described heretofore, and the present invention can be realized if each of the equations described before is satisfied. Hence, the output frequencies of the frequency generators 11 and 30 may be set to k times the frequencies in the embodiments, and the frequency dividing ratio of the frequency divider 12 may be set equal to ¼k, where k is a factor of (35000×l) and (44×j×l). In this case, the frequency dividing ratios of the frequency dividers 17 and 35 are set equal to k/(35000×l) for the B/PAL system, and set equal to k/(44×j×l) for the M/NTSC system.

Next, description will be given with respect to a fourth embodiment of an apparatus according to the present invention which employs the same block system as that shown in FIG. 3. When synchronizing signals and chrominance subcarrier frequencies f$_{SC}$ of one color television system among the M/NTSC system, M/PAL system, B/PAL system, or N/PAL system is to be generated, the frequency generator 30 generates a frequency which is four times or a predetermined integral multiple of the chrominance subcarrier frequency f$_{SC}$ of that system. The frequency generator 30 generates a frequency which is four times or a predetermined integral multiple of the frequency 272f$_H$, if the chrominance subcarrier frequency f$_{OB}$ of the SECAM system is to be generated. The frequency among the five frequencies which is to be generated by the frequency generator 30, is determined by the system of the apparatus such as the television camera to which the synchronizing signal generating apparatus is to be built-in, and the output frequency of the frequency generator 30 is accordingly switched over.

In the present embodiment the output oscillation frequency of the VCO 34 is selected to (616×l) times the horizontal scanning frequency f$_H$ of the color television system used, where l is an arbitrary positive integer. Because the horizontal scanning frequency f$_H$ is equal to 15.734264 kHz in the M/NTSC system and M/PAL system, the above frequency (616×l×f$_H$) becomes equal to (9.692306461×l) MHz for these systems. On the other hand, since the horizontal scanning frequency f$_H$ is equal to 15.625 kHz for the other three color television systems, the output frequency of the VCO 34 becomes equal to (9.625×l) MHz for these three systems.

The present embodiment is designed to satisfy all of five basic equations (12) through (16) below, and the oscillation frequency of the VCO 34 accordingly becomes equal to $(616 \times 1 \times f_H)$.

(I) In order to operate the apparatus for the M/NTSC system, the following equation (12) is to be satisfied, where a is a factor of $(44 \times 1)$.

$$(4 \times a \times f_{SC})/65 = (616 \times 1 \times a \times f_H)/(44 \times 1) \qquad (12)$$

But the following equation is obtained by rewriting equation (12), which satisfies equation (1) described before.

$$f_{SC} = (65 \times 616)f_H/(44 \times 4) = 455 f_H/2$$

(II) In order to operate the apparatus for the M/PAL system, the following equation (13) is to be satisfied, where b is a factor of $(616 \times 1)$.

$$(4 \times b \times f_{SC})/909 = (616 \times 1 \times b \times f_H)/(616 \times 1) \qquad (13)$$

However, the following equation is obtained by rewriting equation (13), which satisfies equation (2) described previously.

$$f_{SC} = 909 f_H/4$$

(III) In order to operate the apparatus for the B/PAL system, the following equation (14) is to be satisfied, where c is a factor of $(35000 \times 1)$.

$$(4 \times c \times f_{SC})/64489 = (616 \times 1 \times c f_H)/(35000 \times 1) \qquad (14)$$

But the following equation is obtained by rewriting equation (14), which satisfies equation (3) described before.

$$f_{SC} = (64489 \times 616)f_H/(4 \times 35000)$$
$$= 1135.0064 f_H/4$$
$$= (1135/4 + 1/625)f_H$$

(IV) In order to operate the apparatus for the N/PAL system, the following equation (15) is to be satisfied, where d is a factor of $(13124 \times 1)$.

$$(4 \times d \times f_{SC})/19537 = (616 \times 1 \times d \times f_H)/(13124 \times 1) \qquad (15)$$

However, the following equation is obtained by rewriting equation (15). The following equation introduces an error of 1/10000000 times the horizontal scanning frequency $f_H$ as compared to equation (4) described previously, but an error of such order does not introduce problems in practice.

$$f_{SC} = (19537 \times 616)f_H/(4 \times 13124)$$
$$= 917.0064004 f_H/4$$
$$= (917/4 + 1/625 + 1/10000000)f_H$$

(V) In order to operate the apparatus for the SECAM system, the following equation (16) is to be satisfied, where e is a factor of $(77 \times 1)$.

$$(4 \times e \times f_{OB})/136 = (e \times 616 \times 1 \times f_H)/(77 \times 1) \qquad (16)$$

But the following equation is obtained by rewriting equation (16), which satisfies equation (5) described before.

$$f_{OB} = (136 \times 616)f_H/(4 \times 77) = 272 f_H$$

As is well known, the carrier chrominance signal of the SECAM system is a line sequential signal in which an FM signal obtained by frequency-modulating a first chrominance subcarrier frequency $f_{OR}$ ($=282 f_H$) by a color difference signal (R−Y) and an FM signal obtained by frequency-modulating a second chrominance subcarrier frequency $f_{OB}$ ($=272 f_H$) by a color difference signal (B−Y) are alternately composed time-sequentially for every horizontal scanning period. Thus, if one of the two chrominance subcarrier frequencies $f_{OR}$ and $f_{OB}$ is generated upon operation of the apparatus for the SECAM system, the other chrominance subcarrier frequency can be formed relatively accurately by an external circuit. The present embodiment is designed to generate the chrominance subcarrier frequency $f_{OB}$. If the chrominance subcarrier frequency $f_{OB}$ is to be generated, the frequency $f_{OB}$ can be generated according to the following basic equation, where i is a factor of $(154 \times 1)$.

$$(4 \times i \times f_{OR})/282 = (i \times 616 \times 1 \times f_H)/(154 \times 1) \qquad (17)$$

The following equation is obtained by rewriting equation (17).

$$f_{OR} = (282 \times 616)f_H/(4 \times 154) = 282 f_H$$

Next, description will be given with respect to the operation of the apparatus according to the present invention in order to satisfy the basic equations (12) through (16). First, when the apparatus is to be operated for the M/NTSC system, the output signal frequency of the frequency generator 30 is selected to a frequency which is 4a times the chrominance subcarrier frequency $f_{SC}$ of the M/NTSC system described by equation (1). This output signal frequency $4af_{SC}$ of the frequency generator 30 is frequency divided by $\frac{1}{4}a$ at the frequency divider 12, and produced through the output terminal 13 and supplied to an external circuit (not shown) as the chrominance subcarrier frequency $f_{SC}$ of the M/NTSC system. On the other hand, the frequency $4af_{SC}$ is supplied to the programmable counter 31 wherein the frequency is divided by 1/65. The frequency dividing ratio of this programmable counter 31 is set to 1/65 by the control signal obtained from the input terminal 32. The same control signal from the input terminal 32 is supplied to the programmable counters 35 and 37 and the logic circuits 36 and 38. Because the apparatus is operated for the M/NTSC system in this case, the frequency dividing ratios of the programmable counters 35 and 37 are respectively set to $a/(44 \times 1)$ and 1/525.

The value of a is a factor of $(44 \times 1)$ as defined in equation (12) when the apparatus is operated for the M/NTSC system. However, if a value is commonly used for a and b, c, d, and e in equations (13), (14), (15), and (16) upon operation of the apparatus for the M/PAL system, B/PAL system, N/PAL system, and SECAM system, that is, if "1" which is a common factor of $(44 \times 1)$, $(616 \times 1)$, $(35000 \times 1)$, $(13124 \times 1)$, and $(77 \times 1)$ is commonly used for the values of a, b, c, d, and e, for example, a fixed $\frac{1}{4}$-frequency divider may be used for the frequency divider 12. If a common value cannot be used for a through e of each of the color television systems, a programmable counter may be used for the frequency divider 12 to appropriately switch the programmable counter according to each of the television systems.

The output signal frequency $4af_{SC}/65$ of the programmable counter 31 is supplied to the phase comparator 33. The phase of the output signal of the programmable counter 31, is thus compared with the phase of a signal which is obtained by frequency-dividing the output oscillation frequency $(616\times1\times f_H)$ of the VCO 34 by $a/(44\times1)$ at the programmable counter 35, at the phase comparator 33. The resulting phase error signal is converted into an appropriate control voltage. This control voltage is passed through a suitable filter (not shown) and applied to the VCO 34 as a control voltage, to variably control the output oscillation frequency of the VCO 34. Accordingly, a loop constituted by a sequence of the phase comparator 33, VCO 34, and programmable counter 35, forms a known phase locked loop (PLL), and operates to set the phase error at the phase comparator 33 to zero. The output oscillation frequency $(616\times1\times f_H)$ of the VCO 34 is in phase synchronism with the output signal of the programmable counter 35, and further, with the output frequency $4af_{SC}$ of the frequency generator 30. In this case, the output signal frequency of the programmable counter 31 described by the first half of equation (12) becomes equal to the output signal frequency of the programmable counter 35 described by the second half of equation (12), as defined in equation (12).

The output oscillation frequency $(616\times1\times f_H)$ of the VCO 34 which is thus in phase synchronism with the output frequency $4af_{SC}$ of the frequency generator 30, is supplied to the programmable counter 35 as described before. On the other hand, this output oscillation frequency of the VCO 34 is also supplied successively to the ½-frequency divider 20 and the 1/308-frequency divider 21a. Because the output signal of the VCO 34 is distorted in most cases and a symmetrical square wave having a 50% duty cycle is difficult to obtain although a signal of a constant period may be obtained, the above frequency divider 20 is provided in order to obtain the symmetrical square wave by frequency-dividing the output oscillation frequency of the VCO 34 by ½. If only the horizontal scanning frequency $f_H$ is to be obtained, this symmetrical square wave is not required. However, the symmetrical square wave is required since it is necessary to produce pulses such as a burst flag pulse or a blanking pulse as the synchronizing signal, in terms of minute intervals.

The frequency dividers 20 and 21a need only be designed so that a sequence is completed for every $1/(616\times1)$ by carrying out appropriate feedback to a series of binary frequency dividing circuits. The symmetrical square wave having a repetition frequency $(308\times1\times f_H)$ which is obtained from the frequency divider 20, and each bit output of the frequency divider 21a, are respectively supplied to the logic circuit 36. The logic circuit 36 counts the incoming input signals, and produces various pulses by discriminating the counted value. Thus, the logic circuit 36 produces various pulses such as a horizontal driving signal related to the horizontal synchronism, in terms of minute intervals obtained by dividing one horizontal scanning period into $(616\times1)$ divisions. In addition, among the various pulses obtained from the logic circuit 36, a pulse series having a repetition frequency $2f_H$ is supplied to the programmable counter 37. If the value of l is set equal to 37 1", an interval in which the frequency divider 21a counts 308 output symmetrical square waves of the frequency divider 20 is equal to one horizontal scanning period. As a result, the pulse series having the repetition frequency $2f_H$ is produced from the logic circuit 36 when the counted value at the frequency divider 21a is equal to "0" or "153".

The programmable counter 37 frequency-divides the above pulse series having the repetition frequency $2f_H$ by 1/525, and supplies each output thereof to the logic circuit 38. The logic circuit 38 produces various pulse series such as a vertical driving signal related to the vertical scanning period, according to the same operating principle used in the logic circuit 36. Each of the pulse series obtained from the logic circuits 36 and 38 are respectively supplied to the logic circuit 39 wherein various pulse series such as composite synchronizing signal, composite blanking signal, and burst flag signal in conformance with the M/NTSC system are produced. If $a=l=1$ when the apparatus is operated for the M/NTSC system, the output frequency of the frequency generator 30 is equal to 14.31818 MHz and the output oscillation frequency of the VCO 34 is equal to 9.692306461 MHz.

Next, description will be given with respect to the operation of the apparatus when the apparatus used for the M/PAL system. In this case, the frequency generator 30 is switched over so as to generate a frequency $4bf_{SC}$. If the value of b is set equal to "1", the frequency $4bf_{SC}$ becomes equal to 14.30244573 MHz, since $4f_{HC}$ is equal to $909f_H$ from equation (2). In addition, the frequency dividing ratios of the programmable counters 31, 35, and 37 are respectively switched to 1/909, $b/(616\times1)$, and 1/525, by the control signal obtained through the input terminal 32. Hence, the output signal frequency of the programmable counter 31 may be described by the first half of equation (13), and the output signal frequency of the programmable counter 35 may be described by the second half of equation (13). As a result, an output oscillation frequency $(616\times1\times f_H)$ (equal to 9.692306461 MHz when $l=1$) which is in phase synchronism with the output signal frequency $4bf_{SC}$ of the frequency generator 30, is obtained from the VCO 34. Various synchronizing signals are obtained according to operations similar to those carried out upon operation of the apparatus when the apparatus is used for the M/NTSC system.

Only the output frequency of the frequency generator 30, the frequency dividing ratios of the programmable counters 31, 35, and 37, and pulse generating timings of the logic circuits 36 and 38 differ, during each operation of the apparatus when the apparatus is used for the B/PAL system, N/PAL system, and SECAM system. The basic operation of the apparatus is the same when the apparatus is used for the M/NTSC system or the M/PAL system. When the apparatus is used for the B/PAL system, the output signal frequency of the frequency generator 30 is set to $4cf_{HC}$ which is equal to 17.734475 MHz if $c=1$. If the apparatus is used for the N/PAL system or SECAM system, the output signal frequency of the frequency generator 30 is set to $4df_{SC}$ ($4df_{SC}$ is equal to 14.328225 MHz if $d=1$) or $4ef_{OB}$ ($4ef_{OB}$ is equal to 17.0 MHz if $e=1$). In addition, frequency dividing ratio of the programmable counter 31 is switched to 1/64489, 1/19537, and 1/136 when the apparatus is used for the B/PAL system, N/PAL system, and SECAM system, respectively. Furthermore, the frequency dividing ratio of the programmable counter 35 is switched to c/(35000×1), d/(13124×1), and e/(77×1) when the apparatus is used for the B/PAL system, N/PAL system, and SECAM system, respectively. However, the frequency dividing ratio of the programmable counter 37 is set to 1/625 in each case where the apparatus is used for the B/PAL system, N/PAL system, or SECAM system.

The output oscillation frequency of the VCO 34 assumes the same frequency (616×1×$f_H$) which is equal to 9.625 MHz if l=1, in each case where the apparatus is used for the B/PAL system, N/PAL system, or SECAM system. The following table shows the frequency dividing ratios of the programmable counters 31, 35, and 37 in each case where the apparatus according to the present invention is used for one of the five color television systems.

TABLE

| System | Frequency Dividing Ratio of Counter 31 | Frequency Dividing Ratio of Counter 35 | Frequency Dividing Ratio of Counter 37 |
|---|---|---|---|
| M/NTSC | 1/65 | a/(44 × l) | 1/525 |
| M/PAL | 1/909 | b/(616 × l) | 1/525 |
| B/PAL | 1/64489 | c/(35000 × l) | 1/625 |
| N/PAL | 1/19537 | d/(13124 × l) | 1/625 |
| SECAM | 1/136 | e/(77 × l) | 1/625 |

Therefore, according to the present embodiment of the invention, the synchronizing signal generating apparatus can be designed as a single integrated circuit because a large portion of the apparatus may be realized by digital circuits except for crystal oscillators connected to the frequency generator 30 and time constant circuits and the like of the VCO 34. Moreover, a chrominance subcarrier frequency, horizontal synchronizing signal, vertical synchronizing signal, and the like in conformance with the standards of an arbitrary color television system among the five color television systems may be generated, by simple switching of circuits.

In the embodiments described heretofore, the VCO 34 is variably controlled by the output phase error voltage of the phase comparator 33. However, the VCO 34 may be designed from a crystal oscillator and the like having a high frequency stability which produces an output oscillation frequency (616×1×$f_H$), and a VCO may be used as the frequency generator 30. In this case, the output frequency of the frequency generator 30 may be variably controlled by the output phase error voltage of the phase comparator 33 as indicated by a dotted line in FIG. 3, so that the output frequency of the frequency generator 30 becomes equal to the frequency $4f_{SC}$ or an integer multiple of $4f_{SC}$.

Figure 4:
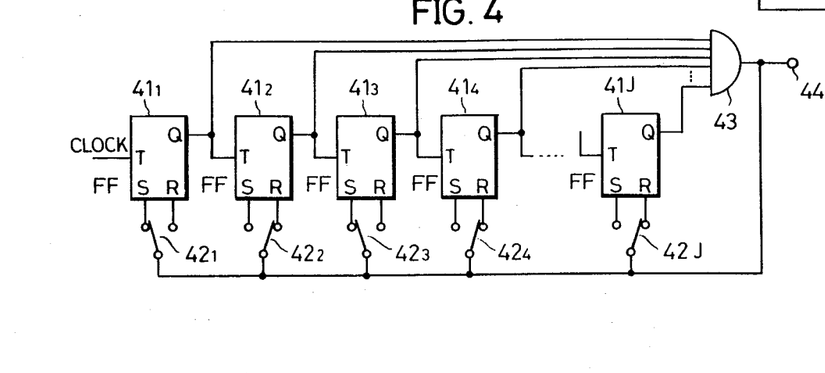
FIG. 4 is a circuit diagram showing an example of a programmable counter.

Next, description will be given with respect to concrete circuit construction of the programmable counters 31, 35, and 37. FIG. 4 is a circuit diagram showing an example of a programmable counter. In FIG. 4, J trigger type (T-type) flip-flops $41_1$ through $41_J$ are connected in series, where J is an arbitrary integer. Each of the Q-output terminals of the flip-flops $41_1$ through $41_J$ are connected to input terminals of an AND circuit 43. An output signal of the AND circuit 43 is produced through an output terminal 44. On the other hand, the output signal of the AND circuit 43 is also selectively supplied to either set terminals S or reset terminals R of the flip-flops $41_1$ through $41_J$, through J switches $42_1$ through $42_J$. A clock pulse is supplied to trigger input terminal of the flip-flop $41_1$.

If it is assumed that all of the flip-flops $41_1$ through $41_J$ are set, the counted value in the programmable counter becomes equal to $(2^J−1)$, and a high-level output signal is obtained from the AND circuit 43 at this point in time. The switches $42_1$ through $42_J$ are controlled and switched over by the control signal obtained through the input terminal 32 according to a number N of the frequency division, so that the counted value in the programmable counter becomes equal to $(2^J−1−N)$ when the high-level output signal obtained from the AND circuit 43. For example, in a case where four flip-flops $41_1$ through $41_4$ constitute the programmable counter, the counted value $(2^J−1−N)$ in the programmable counter becomes equal to "5" when N is equal to "10" because $(2^4−1)=15$. In this case, the switches $42_1$ and $42_3$ are switched over so as to set the first and third flip-flops $41_1$ and $41_3$ by the high-level output signal from the AND circuit 43. In addition, the switches $42_2$ and $42_4$ are switched over so as to reset the second and fourth flip-flops $43_2$ and $43_4$ by the high-level output signal from the AND circuit 43. Accordingly, when all the Q-outputs of the flip-flops $41_1$ through $41_4$ assume high level, that is, when the counted value in the programmable counter becomes equal to "15", a high-level signal is produced from the AND circuit 43. This high-level signal from the AND circuit 43 simultaneously sets the flip-flops $41_1$ and $41_3$ and resets the flip-flops $41_2$ and $42_4$, and the counted value in the programmable counter hence becomes equal to "5". Therefore, this programmable counter produces a high-level signal from the AND circuit 43 every time the programmable counter counts ten pulses. As a result, an output obtained by frequency-dividing the clock pulse frequency by 1/10, is obtained through the output terminal 44.

Figures 5, 6A, 6B, 7A, 7B:
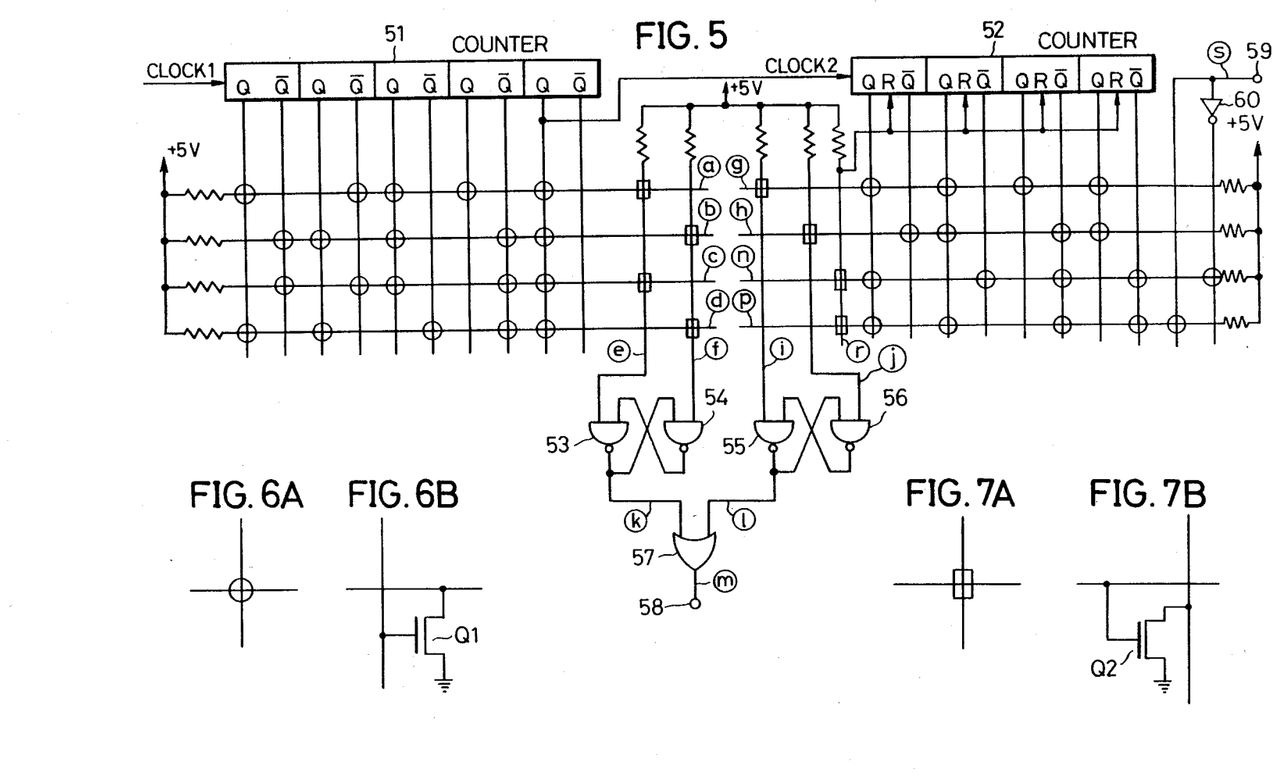
FIG. 5 is a circuit diagram showing an embodiment of a logic circuit.
FIGS. 6A and 6B are diagrams showing a symbol designating parts where output lines of the circuit shown in FIG. 5 intersect, and an example of these parts of the circuit indicated by these symbols in FIG. 5.
FIGS. 7A and 7B are diagrams showing another symbol designating parts where output lines of the circuit shown in FIG. 5 intersect, and an example of these parts of the circuit indicated by these other symbols in FIG. 5.

Next, description will be given with respect to an example of a concrete construction of the logic circuits 36, 38, and 39. FIG. 5 shows a circuit diagram of an example of a logic circuit which may be used for the logic circuit 36, 38, or 39. In FIG. 5, a counter 51 comprising five flip-flops counts a first clock pulse. An output signal from a Q-output terminal of the flip-flop of the counter 51 constituting the most significant bit, is applied to a counter 52 comprising four flip-flops as a second clock pulse. Ten output lines of the counter 51 and eight output lines of the counter 52 are connected to a gate of a field effect transistor (FET) at parts indicated by circular marks, and also connected to a gate of an FET at parts indicated by rectangular marks. Further, a switching signal input terminal 59 is connected to two output lines through an output line s , and an inverter 60 is connected to one of these two output lines.

In FIG. 5, among the parts where the vertical and horizontal lines intersect, at the parts indicated by circular marks as shown in FIG. 6A, the vertical line is coupled to a gate of an FET Q1 while the horizontal line is coupled to a drain (or source) of the FET Q1 as shown in FIG. 6B. On the other hand, at the parts indicated by the rectangular marks in FIG. 5 where the vertical and horizontal lines intersect as shown in FIG. 7A, both the vertical and horizontal lines are coupled to gates of an FET Q2 as shown in FIG. 7B. Either one of the drain and source of the FETs Q1 and Q2 is grounded, and the other of the drain and source of the FETs Q1 and Q2 is coupled to a 5 V power source voltage through a resistor.

If the electric potential of the vertical line at the intersection parts indicated by the circular marks all assume low level, the electric potential of the horizontal lines a, b, c, d, g, h, n, and p in FIG. 5 all assume high level. With respect to the line a, for example, the Q-output of the second flip-flop from the left within the counter 51 shown in FIG. 5 assumes low level when the counted value in the counter 51 becomes equal to "2". On the other hand, the Q-outputs of the other four flip-flops within the counter 51 all assume low level. Accordingly, the electric potential of the line a assumes high level. That is, five intersection parts indicated by the circular marks appropriately supplied with five outputs among the ten outputs of the counter 51, constitute a 5-input NOR circuit, and an output of one such NOR circuit is obtained at the line a. Similarly, three other NOR circuits appropriately supplied with five outputs among the ten outputs of the counter 51, respectively produce outputs through the lines b, c, and d. In addition, four intersection parts indicated by the circular marks appropriately supplied with four outputs among the eight outputs of the counter 52, constitute a 4-input NOR circuit. Two such 4-input NOR circuits are formed in FIG. 5, and outputs of these 4-input NOR circuits are obtained at the lines g and h.

The electric potential of lines e and f assume low level, when either one of the horizontal lines at the intersection parts indicated by the rectangular marks assumes high level. For example, the electric potential of the line e assumes low level when the counted value in the counter 52 becomes equal to "2" or "11". Similarly, the electric potential of the line f assumes low level when the counted value in the counter 52 becomes equal to "9" or "12". Moreover, the electric potential of a line i assumes low level when the counted value in the counter 52 is equal to "0", and the electric potential of a line j assumes low level when the counted value in the counter 52 is equal to "5". In addition, the electric potential at a line r assumes low level when the counted value in the counter 52 is "14" and the electric potential at the line s assumes high level. The electric potential of the line r also assumes low level when the counted value in the counter 52 is "12" and the electric potential of the line s assumes low level. When the electric potential of the line r assumes low level, the counter 52 is reset and the counted value in the counter 52 is set to "0".

The lines e and f are coupled to one input terminal of a 2-input OR circuit 57, through an reset-and-set (R-S) flip-flop comprising NAND circuits 53 and 54. Further, the lines i and j are coupled to the other input terminal of the OR circuit 57, through an R-S flip-flop comprising NAND circuits 55 and 56.

Figure 8:
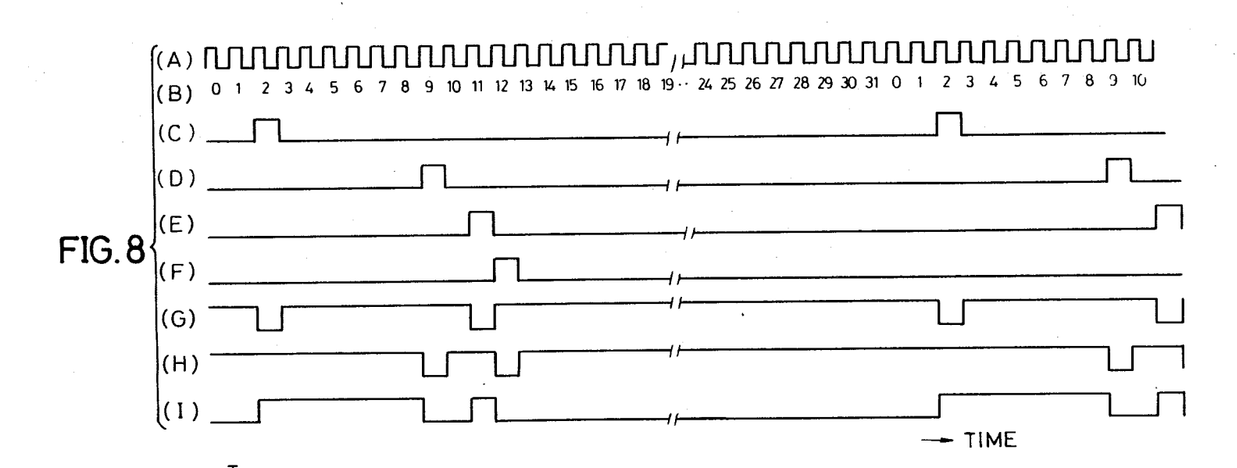
FIGS. 8(A) through 8(I) are time charts for respectively explaining operations of essential parts of the circuit shown in FIG. 5.

Accordingly, if a clock pulse shown in FIG. 8(A) is supplied to the counter 51, the counted value in the counter 51 and the electric potential of the lines a, b, c, and d respectively become as shown in FIGS. 8(B), 8(C), 8(D), 8(E), and 8(F). The electric potential of the lines e and f thus become as shown in FIGS. 8(G) and 8(H). As a result, the electric potential of an output line k of the R-S flip-flop comprising the NAND circuits 53 and 54 assumes high level, when the counted value in the counter 51 is equal to "2" through "8" and "11".

Figure 9:
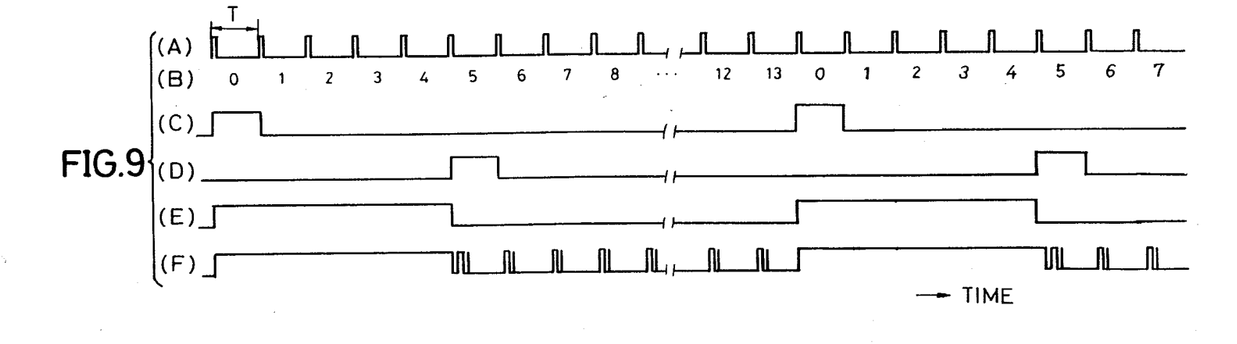
FIGS. 9(A) through 9(F) are time charts for respectively explaining operations of other essential parts of the circuit shown in FIG. 5.

On the other hand, a clock pulse shown in FIG. 9(A) is supplied to the counter 52. A period T of the clock pulse shown in FIG. 9(A), is equivalent to an interval in which a total of thirty-two clock pulses shown in FIG. 8(A) are counted by the counter 51. The counted value in the counter 52 becomes as shown in FIG. 9(B). If a high-level switching signal is applied to the terminal 59, the electric potential of the line s assumes high level. Thus, the electric potential of the line n in FIG. 5 assumes high level when the counted value in the counter 52 becomes "14", and the electric potential of the line r accordingly assumes low level. As a result, the counter 52 is reset. That is, when the level of the line s is high, the counted value in the counter 52 repeatedly assumes values between "0" and "13". Hence, the electric potentials of the lines g and h in this state respectively become as shown in FIGS. 9(C) and 9(D). Hence, the electric potential of an output line l of the R-S flip-flop comprising the NAND circuits 55 and 56 becomes as shown in FIG. 9(E), and assumes high level when the counted value in the counter 52 is between "0" and "4" and assumes low level when the counted value is between "5" and "13". Accordingly, a signal produced through an output terminal 58 through an output line m of the OR circuit 57 becomes as shown in FIG. 9(F). That is, the signal produced through the output terminal 58 assumes high level when the counted value in the counter 52 is between "0" and "4" and assumes the same signal waveform as the signal of the line k when the counted value in the counter 52 is between "5" and "13". This is an example of a case where the dividing number of the horizontal scanning period is "32" and the number of scanning lines is "14".

On the other hand, a low-level switching signal is applied to the terminal 59 when the number of scanning lines is to be switched to twelve. In this case, the level of the line s becomes low, and the level of the line p becomes high when the counted value in the counter 52 becomes "12", and the electric potential of the line r accordingly assumes low level. Therefore, the counter 52 is reset when the counted value therein is equal to "12", and the counted value repeatedly assumes values between "0" and "11". The number of scanning lines is hence switched in this manner, by switching the level of the switching signal applied to the terminal 59.

Further, the present invention is not limited to these embodiments, but various variations and modifications may be made without departing from the scope of the present invention.

What is claimed is:

1. A synchronizing signal generating apparatus for generating a signal having a chrominance subcarrier frequency, a horizontal synchronizing signal, and other synchronizing signals of a desired color television system, said synchronizing signal generating apparatus comprising:
   a first frequency generator for at least generating a frequency which is 4c times the chrominance subcarrier frequency of B, G, H, and I/PAL systems, where c is a factor of (625×n) and n is an arbitrary positive integer;
   a second frequency generator for generating a frequency which is (11×n) times a horizontal scanning frequency;
   a first frequency divider for frequency-dividing an output signal frequency of said first frequency generator by 1/64489;
   a second frequency divider for frequency-dividing an output signal frequency of said second frequency generator by 1/(625×n);
   a phase comparator for comparing phases of output signals of said first and second frequency dividers, and supplying a phas error signal in accordance with the compared result to said first frequency generator or said second frequency generator to variably control the output signal frequency of the first frequency generator or the second frequency generator so that the phase error becomes zero at said phase comparator;

a third frequency divider for frequency-dividing the output signal frequency of said first frequency generator, to produce a frequency equal to the chrominance subcarrier frequency; and a fourth frequency divider for frequency-dividing the output signal frequency of said second frequency generator by $1/(11 \times n)$.

2. A synchronizing signal generating apparatus as claimed in claim 1 in which said integer n is set equal to $(4 \times m)$, where m is an arbitrary positive integer.

3. A synchronizing signal generating apparatus as claimed in claim 1 in which said integer n is set equal to $(56 \times l)$, where l is an arbitrary positive integer.

4. A synchronizing signal generating apparatus for generating a signal having a chrominance subcarrier frequency, a horizontal synchronizing signal, and other synchronizing signals of a desired color television system, said synchronizing signal generating apparatus comprising:

a first frequency generator capable of generating a third frequency and one or more other frequencies among six frequencies, said first frequency generator being switched to generate one output signal frequency, said six frequencies being a first frequency which is 4a times the chrominance subcarrier frequency of an M/NTSC system, where a is a factor of $(44 \times l)$ and l is an arbitrary positive integer, a second frequency which is 4b times the chrominance subcarrier frequency of an M/PAL system, where b is a factor of $(616 \times l)$, a third frequency which is 4c times the chrominance subcarrier frequency of B, G, H, and I/PAL systems, where c is a factor of $(3500 \times l)$, a fourth frequency which is 4d times the chrominance subcarrier frequency of an N/PAL system, where d is a factor of $(13124 \times l)$, a fifth frequency which is 4e times one chrominance subcarrier frequency $f_{OB}$ of a SECAM system, where e is a factor of $(77 \times l)$, and a sixth frequency which is 4i times the other chrominance subcarrier frequency $f_{OR}$ of the SECAM system, where i is a factor of $(154 \times l)$;

a second frequency generator for generating a frequency which is $(616 \times l)$ times a horizontal scanning frequency;

a first frequency divider having a frequency dividing ratio switched according to one output signal frequency of said first frequency generator, for frequency-dividing the output signal frequency of said first frequency generator, said frequency dividing ratio of said first frequency divider being set equal to 1/909, 1/64489, 1/19537, 1/136, or 1/282, when said one output signal frequency of said first frequency generator is equal to the first, second, third, fourth, fifth, or sixth frequency, respectively;

a second frequency divider having a frequency dividing ratio switched in accordance with the switching of the frequency dividing ratio of said first frequency divider, for frequency-dividing the output signal frequency of said second frequency generator, said frequency dividing ratio of said second frequency divider being set equal to $a/(44 \times l)$, $b/(616 \times l)$, $c/(35000 \times l)$, $d/(13124 \times l)$, $e/(77 \times l)$, or $i/(154 \times l)$ when said one output signal frequency of said first frequency generator is equal to the first, second, third, fourth, fifth, or sixth frequency;

a phase comparator for comparing phases of output signals of said first and second frequency dividers, and supplying a phase error signal in accordance with the compared result to said first frequency generator or said second frequency generator to variably control the output signal frequency of the first frequency generator or the second frequency generator so that the phase error becomes zero at said phase comparator;

a third frequency divider for frequency-dividing the output signal frequency of said first frequency generator, to produce a frequency equal to the chrominance subcarrier frequency;

a fourth frequency divider for frequency-dividing the output signal frequency of said second frequency generator into $1/(308 \times l)$ its original frequency; and frequency dividing circuit means for frequency-dividing an output signal frequency of said fourth frequency divider, to produce at least a horizontal synchronizing signal and a vertical synchronizing signal.

5. A synchronizing signal generating apparatus as claimed in claim 4 in which said fourth frequency divider is supplied with an output symmetrical square wave from a ½ frequency divider for frequency-dividing the output signal frequency of said second frequency generator by ½.

6. A synchronizing signal generating apparatus as claimed in claim 4 in which said first and second frequency dividers are programmable counters.

* * * * *

UNITED STATES PATENT AND TRADEMARK OFFICE
CERTIFICATE OF CORRECTION

PATENT NO. : 4,500,909
DATED : February 19, 1985
INVENTOR(S) : MACHIDA, Toyotaka It is certified that error appears in the above-identified patent and that said Letters Patent is hereby corrected as shown below:

Claim 1, column 18, line 68, delete "phas" and replace therefor

-- phase --

Claim 4, column 19, line 39, delete "3500" and replace therefor

-- 35000 --

Signed and Sealed this

Twenty-second Day of April 1986

[SEAL]

Attest:

DONALD J. QUIGG

Attesting Officer     Commissioner of Patents and Trademarks